United States Patent
Li et al.

(10) Patent No.: US 10,105,672 B2
(45) Date of Patent: Oct. 23, 2018

(54) THERMAL BARRIER COATING AND AN ULTRA-HIGH-TEMPERATURE COLD-WALL SUSPENSION BED HYDROGENATION REACTOR COMPRISING THE SAME

(71) Applicant: Beijing Huashi United Energy Technology and Development Co., Ltd., Beijing (CN)

(72) Inventors: Lin Li, Beijing (CN); Lixin Guo, Beijing (CN); Zhenduo Li, Beijing (CN)

(73) Assignee: Beijing Huashi United Energy Technology and Development Co., Ltd., Beijing (CN)

( * ) Notice: Subject to any disclaimer, the term of this patent is extended or adjusted under 35 U.S.C. 154(b) by 0 days.

(21) Appl. No.: 15/702,019

(22) Filed: Sep. 12, 2017

(65) Prior Publication Data

US 2018/0085729 A1  Mar. 29, 2018

(30) Foreign Application Priority Data

Sep. 23, 2016 (CN) .......................... 2016 1 0849555

(51) Int. Cl.
*B01J 19/02* (2006.01)
*B01J 8/18* (2006.01)
*C04B 35/48* (2006.01)
*C04B 35/622* (2006.01)
*C09D 1/00* (2006.01)
*C09J 1/00* (2006.01)
*C09D 7/61* (2018.01)
*C09J 7/29* (2018.01)
*C08K 3/22* (2006.01)

(52) U.S. Cl.
CPC ............ *B01J 19/02* (2013.01); *B01J 8/1872* (2013.01); *C04B 35/48* (2013.01); *C04B 35/62222* (2013.01); *C09D 1/00* (2013.01); *C09D 7/61* (2018.01); *C09J 1/00* (2013.01); *C09J 7/29* (2018.01); *B01J 2219/0218* (2013.01); *B01J 2219/0236* (2013.01); *C04B 2235/3246* (2013.01); *C04B 2235/9607* (2013.01); *C08K 2003/2227* (2013.01); *C08K 2003/2244* (2013.01); *C09J 2400/123* (2013.01)

(58) Field of Classification Search
CPC ................... B01J 19/02; B01J 19/0053; B01J 2219/0218; B01J 2219/0236; B01J 8/1872; B01J 8/008
See application file for complete search history.

(56) References Cited

U.S. PATENT DOCUMENTS 8,337,989 B2 * 12/2012 Gero ..................... C23C 14/027
                                                    416/241 B

FOREIGN PATENT DOCUMENTS

CN          1657653 A         8/2005

OTHER PUBLICATIONS

Gang, et al., Thermal Behavior of Thermal Barrier Coatings Composed with $Al_2O_3$ Sprayed by Plasma, Rare Metal Materials and Engineering, Vo. 32, No. 9, pp. 756-760, Sep. 2003.
Chinese First Office Action for Chinese Application No. 201610849552 dated May 3, 2018 with English translation.

* cited by examiner

*Primary Examiner* — Lessanework Seifu
(74) *Attorney, Agent, or Firm* — McCarter & English, LLP

(57) ABSTRACT

A thermal barrier coating and a cold-wall reactor including the coating are provided. A second ceramic layer is sandwiched between the conventional two-layer structures of the thermal barrier coating. The second ceramic layer is made of aluminum oxide stabilized zirconium oxide and the content of aluminum oxide does not exceed 30 wt %. The zirconium oxide in the first and second ceramic layer has a tetragonal crystal structure. A cold-wall reactor formed by applying the thermal barrier coating provides advantageous steel hydrogen corrosion resistance in ultra-high temperature. The effective volume of the hydrogenation reactor is fully used, overcoming the problem that the thermal insulation liner is easily damaged and causes local overheating of the reactor wall, as well as eliminating potential safety hazards of reactor wall local stress concentration caused by expansion and contraction of the liner cylinder attachment member.

19 Claims, No Drawings

THERMAL BARRIER COATING AND AN ULTRA-HIGH-TEMPERATURE COLD-WALL SUSPENSION BED HYDROGENATION REACTOR COMPRISING THE SAME

TECHNICAL FIELD

The invention belongs to the technical field of chemical industry equipment, in particular relates to a thermal barrier coating and a cold-wall reactor that comprises said thermal barrier coating adapted for ultra-high-temperature suspension bed hydrogenation.

BACKGROUND OF THE INVENTION

Hydrogenation reactor is commonly used in the hydrogenation processes of coal chemical industry and petrochemical industry. Hydrogenation reactor can be divided into two categories, a "hot-wall" reactor and a "cold-wall" reactor, depending on the temperature of its shell. The hot wall reactor does not have an inner heat-insulation layer, so that the difference between the cylinder wall temperature and the internal reaction temperature is small; a cold-wall reactor has an internal heat insulation layer, under which the temperature of cylinder wall temperature is far lower than that of the internal reaction.

The wall temperature of hot-wall reactor uniformly distributes and does not easily generate local overheating, which can improve the safety of use. However, with the development of heavy oil hydrogenation technology and the success of establishing first set of self-developed super suspension bed hydrogenation technology in China, the design temperature of suspension bed hydrogenation reactor is continuously raised, even up to 500° C., which has greatly exceeded the maximum using temperature (482° C.) of conventional anti-hydrogen corrosion steel in China and abroad. Thereby conventional hot-wall reactor is not suitable for ultra-high-temperature hydrogenation process.

Due to the relatively low temperature of the barrel wall of the cold-wall reactor, it can be applied to the working condition in which the internal reaction temperature is higher than the maximum temperature limit of the barrel wall materials. The conventional cold-wall reactor comprises a reactor body and a support seat. Furthermore, the reactor body comprises a vertically arranged cylinder body as well as an upper sealing head and a lower sealing head that are connected to the top and bottom of the cylinder body, respectively. The upper sealing head is provided with a discharge pipe, and the lower seal head is provided with a feeding pipe. From outside to inside, the structure of the cylinder body, the upper seal head and the lower seal head sequentially comprises: a metal shell, a stainless steel surfacing layer, a thermal insulation liner and a inner liner cylinder. The thermal insulation liner comprises an insulating firebrick layer clinging to the inner wall of the stainless steel resurfacing welding layer and a heat insulation packing layer clinging to the outer wall of the inner liner cylinder. The inner liner cylinder is connected with the metal shell and is fixed in the center of the reactor. For example, for a suspended bed hydrogenation cold-wall reactor with a design temperature of 500° C. and a design pressure of 23 Mpa, the material of the metal shell is typically 2.25Cr–1Mo –0.25V steel with a thickness of about 100 mm to 200 mm, the material of the stainless steel resurfacing welding layer is TP309+TP347 with a thickness of about 7 mm to 10 mm, the material of the thermal insulation liner is $Al_2O_3$+CaO with a thickness of about 100 mm to 150 mm and the material of the inner liner cylinder is SS321 with a thickness of about 7 mm to 10 mm.

Thus, conventional hydrogenation cold-wall reactor still has the following problems: 1. in the same profile dimensions, the effective volume of the reactor is small which impact the productivity. To reach the same productivity, the overall size needs to be increased, which increases the difficulty of manufacture and the investment cost of equipment. 2. Due to the relatively thick thermal liner, the design, manufacture and construction of the cold-wall reactor are more complicated, and the inner wall examination is also very inconvenient. Furthermore, the thermal insulation liner is easily damaged in actual working conditions, resulting in infiltration/flow of the hot fluid onto the wall and localized ultra-temperature on metal shell. This would compromise the safety production or forced shutdown. 3. Due to the fixed connection between the inner liner cylinder and the outer shell, when any flaws presented in the construction process or design, the connection part will expand and contract at the operating temperature which leads to concentration of local stress on the outer shell body. This causes potential safety hazards.

DETAILED DESCRIPTION

The invention aims to solve the technical problems that the existing cold-wall reactor has small effective volume, the local stress concentration on the outer shell body and the thermal insulation liner is thick and is easy to be damaged. Thereby the invention provides a cold-wall reactor of which the effective volume is large, the outer shell body does not have local stress concentration, the thermal insulation liner is thin and is not easy to damage, and which can be applied to ultra-high-temperature suspension bed hydrogenation.

Therefore, in one respect, the present invention provides a thermal barrier coating, comprising
an adhesive layer,
a first ceramic layer, and
a second ceramic layer arranged in between the adhesive layer and the first ceramic layer;
wherein the second ceramic layer is made of alumina stabilized zirconia, the content of alumina in the second ceramic layer does not exceed 30 wt %, and the rest is zirconia;
wherein the first ceramic layer is made of yttrium oxide stabilized zirconia, the content of yttrium oxide in the first ceramic layer is 6-9 wt %, and the rest is zirconium oxide; and
wherein the zirconium oxide in the first ceramic layer and the second ceramic layer has a tetragonal crystal structure.

Preferably, the first ceramic layer of the thermal barrier coating has a thickness of 0.1-0.5 mm.

Preferably, the second ceramic layer of the thermal barrier coating has a thickness of 3-10 mm.

Preferably, the thermal barrier coating further comprises an anti-corrosion layer which is arranged in between the second ceramic layer and the adhesive layer.

Preferably, the anti-corrosion layer is made of alumina oxide.

Preferably, the anti-corrosion layer has a thickness of 10-15 μm.

Preferably, the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

Preferably, the adhesive layer has a thickness of 30-100 µm.

In another aspect, the present invention provides an ultra-high-temperature cold-wall suspension bed hydrogenation reactor, comprising a reactor cylinder body which comprises sequentially connected following elements: an outer shell, a stainless steel resurfacing welding layer, and a thermal barrier coating, wherein the adhesive layer of the thermal barrier coating is closely attached to the stainless steel resurfacing welding layer.

Preferably, the stainless steel resurfacing welding layer has a thickness of 4-7 mm.

The technical solution of the present invention has the following advantages:

1, the present invention provides a thermal barrier coating, wherein the second ceramic layer is arranged between the conventional two-layer structures. The second ceramic layer is made of aluminum oxide stabilized zirconium oxide and the content of aluminum oxide is no more than 30 wt %. The first ceramic layer is made of yttrium-stabilized zirconium oxide and the content of yttrium oxide is 6-9 wt %. The zirconium oxide in the first ceramic layer and the second ceramic layer has a tetragonal crystal structure. Thus, the thermal barrier coating of the present invention has the following features:

a. low thermal conductivity, and the lowest is 1.5 W/(m·K), such that the thermal conductivity can be effectively blocked;

b. a high coefficient of thermal expansion: as in the case of below 1100° C., the tetragonal $ZrO_2$ tend to expand and turn into a monoclinic $ZrO_2$ and produce a 3-5% volume expansion, thereby it is possible to increase the thermal expansion coefficient of the entire coating up to $1.3 \times 10^7 /°C.$, which is consistent with the coefficient of thermal expansion of the stainless steel, thus the thermal expansion and contraction of the thermal barrier coating can be consistent with that of the outer shell under operating conditions, which reduces the local stress of the outer shell;

c. great fracture toughness: due to the local residual stress in the coating, the tetragonal $ZrO_2$ under stress conditions changes phase to a monoclinic $ZrO_2$ and generates a certain number of microcracks, which reduces the elastic modulus of the active region, when subjected to external force, the micro-cracks slowly expand from a subcritical crack such that a portion of the main crack tip strain energy is released and the energy required for further expansion of the main crack is increased, which effectively suppresses the crack propagation, improves the fracture toughness of the entire coating, and ensures that that coating does not break under high-temperature working conditions;

d. great thermal shock resistance: the thermal barrier coating of the present invention has very few large-size pores and cracks, but mostly microcracks and pores with the size of less than 10 µm. Thus it effectively absorbs and alleviates the thermal stress generated during anti-thermal shock cycles, improves strain capacity of the coating, improves the thermal shock resistance of the entire thermal barrier coating, and ensures that the coating does not crack in high-temperature working conditions due to thermal shock.

2. The present invention provides a thermal barrier coating, in which an anti-corrosion layer made of aluminum oxide is arranged between the second ceramic layer and the adhesive layer. It effectively prevents hydrogen atoms penetrate through the two ceramic layers and etching the substrate in high-pressure hydrogen storage conditions, and improves the corrosion resistance of the substrate while maintaining the high temperature resistance of the substrate.

3. The present invention provides an ultra-high-temperature suspension bed hydrogenation cold-wall reactor, wherein the thermal barrier coating replaces the traditional thermal liner and the inner liner cylinder. As the thickness of the thermal barrier coating is no more than 11 mm, the thickness of the stainless steel weld overlay may also reduce at the same time. As a result, in the same profile size, the effective volume of the reactor interior is increased and the production capacity is improved; in addition, because the thermal barrier coating of the present invention have the consistent coefficient of thermal expansion with the stainless steel, the local stresses on the outer shell of the cold-wall reactor can be reduced and the potential safety hazard of the reactor can be eliminated; Moreover, due to the higher fracture toughness and thermal shock resistance of the thermal barrier coating, the present invention ensures that the cold-wall reactor is still not easy to damage at high-temperature working conditions up to 500° C., which avoids locally excessive temperature of the reactor outer shell and make the cold-wall reactor applicable to the ultra-high temperature of suspension bed hydrogenation process.

Therefore, the cold-wall reactor completely overcomes the defects of the traditional hydrogenation cold-wall reactor, which not only satisfies the using requirement of the existing hydrogen corrosion resistant steel (2.25Cr–1Mo–0.25V) in ultra-high temperature but also fully utilizes the effective volume of the hydrogenation reactor. It not only overcomes the problem that the thermal liner is easily damaged and causes local overheating of the reactor wall, but also eliminates the potential safety hazards due to local stress concentration on reactor wall caused by the expansion and contraction of the liner cylinder attachment member. In addition, the cold-wall reactor may allow increase in the reaction temperature of the internal medium to accelerate the reaction rate, shorten the reaction time, and improve the yield of the liquid phase.

EMBODIMENTS

The technical solution of the present invention is clearly and fully described in the following. Apparently, the described embodiments are a part of the embodiments of the present invention, rather than all. All other embodiments, performed by a skilled person in the art without any creative efforts, are within the scope of invention protection. In addition, the technical features involved in the following description of various embodiments may be combined with each other as long as they do not form a conflict between each other.

Embodiment 1

The present embodiment provides a thermal barrier coating prepared with atmospheric plasma spray technique. The thermal barrier coating comprises, sequentially connected, an adhesive layer of a thickness of 30 µm, a second ceramic layer of a thickness of 10 mm and a first ceramic layer of a thickness of 0.3 mm, wherein:

The adhesive layer is made of NiCrAlY. Based on the total mass of the adhesive layer, the content of Cr is 25 wt %, the content of Al is 10 wt %, the content of Y is 1.3 wt %, and the balance is Ni. The second ceramic layer is made of aluminum oxide-stabilized zirconium oxide, and based on the total mass of the second ceramic layer, the content of aluminum oxide is 30 wt %, and the balance is zirconium oxide. The first ceramic layer is made of yttrium oxide-stabilized zirconium oxide, and based on the total mass of the first ceramic layer, the first ceramic layer contains 6 wt % yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.52 W/(m·K), a thermal expansion coefficient of $1.0 \times 10^{-7}$ m/° C. and a fracture toughness value of 12 MPa·m$^{0.5}$.

The thermal barrier coating of the present embodiment is used to replace the thermal insulation liner and the inner liner cylinder in the conventional cold-wall reactor, thereby establishing a cold-wall reactor applicable for ultra-high-temperature suspension bed hydrogenation. The cold wall reactor comprises a reactor cylinder body which further comprises sequentially connected following elements: an outer shell, a stainless steel resurfacing welding layer and the thermal barrier coating. The adhesive layer of the thermal barrier coating is attached to the stainless steel resurfacing welding layer which has a thickness of 4 mm.

Embodiment 2

The present embodiment provides a thermal barrier coating prepared with atmospheric plasma spray technique. The thermal barrier coating comprises followings that are sequentially connected: an adhesive layer of a thickness of 65 μm, an anti-corrosion layer of a thickness of 10 μm, a second ceramic layer of a thickness of 3 mm and a first ceramic layer of a thickness of 0.1 mm, wherein:

The adhesive layer is made of CoNiCrAlY, and based on the total mass of the adhesive layer, the content of Cr is 30 wt %, the content of Al is 7.5 wt %, the content of Y is 1.1 wt %, the content of Co is 1 wt %, and the balance is Ni. The anti-corrosion layer is made of aluminum oxide. The second ceramic layer is made of aluminum oxide-stabilized zirconium oxide, and based on the total mass of the second ceramic layer, the content of aluminum oxide is 22 wt %, and the balance is zirconium oxide. The first ceramic layer is made of yttrium oxide-stabilized zirconium oxide, and based on the total mass of the first ceramic layer, the first ceramic layer contains 7 wt % of yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.58 W/(m·K), a thermal expansion coefficient of $1.06 \times 10^{-7}$ m/° C. and a fracture toughness value of 11 MPa·m$^{0.5}$.

The thermal barrier coating of the present embodiment is used to replace the thermal insulation liner and the inner liner cylinder in the conventional cold-wall reactor, thereby establishing a cold-wall reactor applicable for ultra-high-temperature suspension bed hydrogenation. The cold-wall reactor comprises a reactor cylinder body which further comprises sequentially connected following elements: an outer shell, a stainless steel resurfacing welding layer and the thermal barrier coating. The adhesive layer of the thermal barrier coating is attached to the stainless steel resurfacing welding layer which has a thickness of 7 mm.

Embodiment 3

The present embodiment provides a thermal barrier coating which is prepared with atmospheric plasma spray technique. The thermal barrier coating comprises sequentially connected followings: an adhesive layer of a thickness of 80 μm, an anti-corrosion layer of a thickness of 13 μm, a second ceramic layer of a thickness of 6.5 mm and a first ceramic layer of a thickness of 0.4 mm, wherein:

The adhesive layer is made of FeCoCrAlY, and based on the total mass of the adhesive layer, the content of Cr is 35 wt %, the content of Al is 5 wt %, the content of Y is 1.5 wt %, the content of Co is 0.8 wt %, and the balance is Fe. The anti-corrosion layer is made of aluminum oxide. The second ceramic layer is made of aluminum oxide-stabilized zirconium oxide, and based on the total mass of the second ceramic layer, the content of aluminum oxide is 25 wt %, and the balance is zirconium oxide. The first ceramic layer is made of yttrium oxide-stabilized zirconium oxide, and based on the total mass of the first ceramic layer, the first ceramic layer contains 8 wt % yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.51 W/(m·K), a thermal expansion coefficient of $1.1 \times 10^{-7}$ m/° C. and a fracture toughness value of 13 MPa·m$^{0.5}$.

The thermal barrier coating of the embodiment is employed to replace the thermal insulation liner and the inner liner cylinder in the conventional cold-wall reactor, thereby establishing a cold-wall reactor applicable for ultra-high-temperature suspension bed hydrogenation. The cold-wall reactor comprises a reactor cylinder body which further comprises sequentially connected following elements: an outer shell, a stainless steel resurfacing welding layer and the thermal barrier coating. The adhesive layer of the thermal barrier coating is closely attached to the stainless steel resurfacing welding layer which has a thickness of 5 mm.

Embodiment 4

The present embodiment provides a thermal barrier coating prepared with atmospheric plasma spray technique. The thermal barrier coating comprises sequentially connected followings: an adhesive layer of a thickness of 100 μm, an anti-corrosion layer of a thickness of 15 μm, a second ceramic layer of a thickness of 8 mm and a first ceramic layer of a thickness of 0.5 mm, wherein:

The adhesive layer is made of FeNiCrAlY, and based on the total mass of the adhesive layer, the content of Cr is 28 wt %, the content of Al is 6 wt %, the content of Y is 1.2 wt %, the content of Fe is 1 wt %, and the balance is Ni. The anti-corrosion layer is made of aluminum oxide. The second ceramic layer is made of aluminum oxide-stabilized zirconium oxide, and based on the total mass of the second ceramic layer, the content of aluminum oxide is 27 wt %, and the balance is zirconium oxide. The first ceramic layer is made of yttrium oxide-stabilized zirconium oxide, and based on the total mass of the first ceramic layer, the first ceramic layer contains 9 wt % yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.55 W/(m·K), a thermal expansion coefficient of $1.25 \times 10^{-7}$ m/° C. and a fracture toughness value of 10 MPa·m$^{0.5}$.

The thermal barrier coating of the embodiment is employed to replace the thermal insulation liner and the inner liner cylinder in the conventional cold-wall reactor, thereby establishing a cold-wall reactor applicable for ultra-high-temperature suspension bed hydrogenation. The cold-wall reactor comprises a reactor cylinder body which further comprises sequentially connected following elements: an outer shell, a stainless steel resurfacing welding layer and the thermal barrier coating. The adhesive layer of the thermal barrier coating is closely attached to the stainless steel resurfacing welding layer which has a thickness of 6 mm.

Embodiment 5

The present embodiment provides a thermal barrier coating prepared with atmospheric plasma spray technique, which comprises sequentially connected followings: an adhesive layer of a thickness of 45 µm, an anti-corrosion layer of a thickness of 12 µm, a second ceramic layer of a thickness of 4 mm and a first ceramic layer of a thickness of 0.2 mm, wherein:

The adhesive layer is made of FeCrAlY, and based on the total mass of the adhesive layer, the content of Cr is 30 wt %, the content of Al is 8 wt %, the content of Y is 1.4 wt %, and the balance is Fe. The anti-corrosion layer is made of aluminum oxide. The second ceramic layer is made of aluminum oxide-stabilized zirconium oxide, and based on the total mass of the second ceramic layer, the content of aluminum oxide is 29 wt %, and the balance is zirconium oxide. The first ceramic layer is made of yttrium oxide-stabilized zirconium oxide, and based on the total mass of the first ceramic layer, the first ceramic layer contains 7.5 wt % yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.53 W/(m·K), a thermal expansion coefficient of $1.27 \times 10^{-7}$ m/° C. and a fracture toughness value of 12 MPa·m$^{0.5}$.

The thermal barrier coating of the embodiment is employed to replace the thermal insulation liner and the inner liner cylinder in the conventional cold-wall reactor, thereby establishing a cold-wall reactor applicable for ultra-high-temperature suspension bed hydrogenation. The reactor comprises a reactor cylinder body which further comprises sequentially connected following elements: an outer shell, a stainless steel resurfacing welding layer and the thermal barrier coating. The adhesive layer of the thermal barrier coating is closely attached to the stainless steel resurfacing welding layer which has a thickness of 7 mm.

Embodiment 6

The present embodiment provides a thermal barrier coating prepared with atmospheric plasma spray technique. The thermal barrier coating comprises sequentially connected followings: an adhesive layer of a thickness of 50 µm, an anti-corrosion layer of a thickness of 11 µm, a second ceramic layer of a thickness of 5 mm and a first ceramic layer of a thickness of 0.2 mm, wherein:

The adhesive layer is made of FeCrAlY, and based on the total mass of the adhesive layer, the content of Cr is 33 wt %, the content of Al is 9 wt %, the content of Y is 1.4 wt %, and the balance is Fe. The anti-corrosion layer is made of aluminum oxide. The second ceramic layer is made of aluminum oxide-stabilized zirconium oxide, and based on the total mass of the second ceramic layer, the content of aluminum oxide is 28 wt %, and the balance is zirconium oxide. The first ceramic layer is made of yttrium oxide-stabilized zirconium oxide, and based on the total mass of the first ceramic layer, the first ceramic layer contains 7.5 wt % yttrium oxide, and the balance is zirconium oxide. The zirconium oxide in the first ceramic layer and the second ceramic layer has a tetragonal crystal structure.

After measurement, in this embodiment, the thermal barrier coating has a thermal conductivity of 1.5 W/(m·K), a thermal expansion coefficient of $1.3 \times 10^{-7}$ m/° C. and a fracture toughness value of 13 MPa·m$^{0.5}$.

The thermal barrier coating of the embodiment is employed to replace the thermal insulation liner and the inner liner cylinder in the conventional cold-wall reactor, thereby establishing a cold-wall reactor applicable for ultra-high-temperature suspension bed hydrogenation. The reactor cold-wall comprises a reactor cylinder body which further comprises sequentially connected following elements: an outer shell, a stainless steel resurfacing welding layer and the thermal barrier coating. The adhesive layer of the thermal barrier coating is closely attached to the stainless steel resurfacing welding layer which has a thickness of 5 mm.

Comparative Embodiment

The present comparative embodiment employs a thermal barrier coating prepared with atmospheric plasma spray technique. The thermal barrier coating comprises connected followings: an adhesive layer of a thickness of 100 µm and a ceramic layer of a thickness of 0.5 mm. The materials making the adhesive layer here is the same as the materials making the adhesive layer in the embodiment 4. The materials making the ceramic layer here is the same as the materials making the first ceramic layer in the embodiment 4.

After measurement, in this comparative embodiment, the thermal barrier coating has a thermal conductivity of 2 W/(m·K), a thermal expansion coefficient of $0.9 \times 10^{-7}$ m/° C. and a fracture toughness value of 7 MPa·m$^{0.5}$.

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:
1. A thermal barrier coating, comprising
an adhesive layer,
a first ceramic layer, and
a second ceramic layer arranged in between the adhesive layer and the first ceramic layer;
wherein the second ceramic layer is made of alumina stabilized zirconia, the content of alumina in the second ceramic layer does not exceed 30 wt %, and the rest is zirconia;
wherein the first ceramic layer is made of yttrium oxide stabilized zirconia, the content of yttrium oxide in the first ceramic layer is 6-9 wt %, and the rest is zirconium oxide; and
wherein the zirconium oxide in the first ceramic layer and the second ceramic layer has a tetragonal crystal structure.

2. The thermal barrier coating according to claim 1, wherein the first ceramic layer has a thickness of 0.1-0.5 mm.

3. The thermal barrier coating according to claim 1, wherein the second ceramic layer has a thickness of 3-10 mm.

4. The thermal barrier coating according to claim 1, further comprising an anti-corrosion layer which is arranged in between the second ceramic layer and the adhesive layer.

5. The thermal barrier coating according to claim 4, wherein the anti-corrosion layer is made of alumina oxide.

6. The thermal barrier coating according to claim 4, wherein the anti-corrosion layer has a thickness of 10-15 μm.

7. The thermal barrier coating according to claim 1, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

8. The thermal barrier coating according to claim 1, wherein the adhesive layer has a thickness of 30-100 μm.

9. The thermal barrier coating according to claim 2, wherein the second ceramic layer has a thickness of 3-10 mm.

10. The thermal barrier coating according to claim 2, further comprising an anti-corrosion layer which is arranged in between the second ceramic layer and the adhesive layer.

11. The thermal barrier coating according to claim 3, further comprising an anti-corrosion layer which is arranged in between the second ceramic layer and the adhesive layer.

12. The thermal barrier coating according to claim 5, wherein the anti-corrosion layer has a thickness of 10-15 μm.

13. The thermal barrier coating according to claim 2, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

14. The thermal barrier coating according to claim 3, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

15. The thermal barrier coating according to claim 4, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

16. The thermal barrier coating according to claim 5, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

17. The thermal barrier coating according to claim 6, wherein the adhesive layer is made of MCrAlY, in which the content of Cr is 25-35 wt %, the content of Al is 5-10 wt %, the content of Y is 1.1-1.5 wt %, and the rest is M, and M is one or combination of the following: Ni, Fe, and Co.

18. An ultra-high-temperature cold-wall suspension bed hydrogenation reactor, comprising a reactor cylinder body which comprises sequentially connected following elements:
   an outer shell,
   a stainless steel resurfacing welding layer, and
   a thermal barrier coating according to claim 1,
   wherein the adhesive layer of the thermal barrier coating is closely attached to the stainless steel resurfacing welding layer.

19. The reactor according to claim 9, wherein the stainless steel resurfacing welding layer has a thickness of 4-7 mm.

* * * * *